US007826658B2

(12) United States Patent
Sato et al.

(10) Patent No.: US 7,826,658 B2
(45) Date of Patent: Nov. 2, 2010

(54) IMAGE PROCESSING SYSTEM, IMAGE PROCESSING METHOD, IMAGE PROCESSING RECORDING MEDIUM, AND PROGRAM SUITABLE FOR EXTRACTION PROCESSING

(75) Inventors: Nobuyuki Sato, Tokyo (JP); Ken Nakajima, Tokyo (JP); Katsuaki Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 10/514,366

(22) PCT Filed: Apr. 16, 2003

(86) PCT No.: PCT/JP03/04810

§ 371 (c)(1), (2), (4) Date: Aug. 29, 2005

(87) PCT Pub. No.: WO03/098941

PCT Pub. Date: Nov. 27, 2003

(65) Prior Publication Data

US 2006/0055794 A1 Mar. 16, 2006

(30) Foreign Application Priority Data

May 15, 2002 (JP) .............................. 2002-139574

(51) Int. Cl.
*G06K 9/00* (2006.01)
*G06K 9/46* (2006.01)
*G06K 9/40* (2006.01)
*H04N 9/73* (2006.01)
*G09G 5/02* (2006.01)

(52) U.S. Cl. ...................... 382/165; 382/194; 382/264; 382/162; 382/192; 348/223.1; 345/589

(58) Field of Classification Search ......... 382/162–167, 382/190–195, 260–265; 348/222.1, 223.1; 345/589, 590, 605, 593
See application file for complete search history.

(56) References Cited

U.S. PATENT DOCUMENTS 4,602,289 A * 7/1986 Sekine ....................... 348/315

(Continued)

FOREIGN PATENT DOCUMENTS

EP 0 667 718 8/1995

(Continued)

*Primary Examiner*—Bhavesh M Mehta
*Assistant Examiner*—Mia M Thomas
(74) *Attorney, Agent, or Firm*—Frommer Lawrence & Haug LLP; William S. Frommer; Thomas F. Presson

(57) ABSTRACT

An image-processing apparatus for processing images, whereby the image-processing apparatus includes an image capture unit, a filter, and an extraction unit. The image capture unit acquires image signals composed of multiple color components of a 2×2 color-coding array. The filter then calculates an average pixel value associated with any (2n−1) pixels acquired by the image capture unit, whereby each of the filtered (2n−1) pixels include a target pixel and adjacent pixels having the same color component as that of the target pixel, and the calculated average is designated as the average of the target pixel and the adjacent pixels. At the extraction unit the pixel having the average calculated by the filter as the pixel value is extracted at an extraction rate of 1/(2n−1), where n is a positive integer value.

14 Claims, 18 Drawing Sheets

U.S. PATENT DOCUMENTS

| | | | |
|---|---|---|---|
| 5,091,967 A * | 2/1992 | Ohsawa | 382/172 |
| 5,452,338 A * | 9/1995 | Granfors et al. | 378/98.11 |
| 5,493,335 A * | 2/1996 | Parulski et al. | 348/231.6 |
| 5,552,827 A * | 9/1996 | Maenaka et al. | 348/266 |
| 5,706,366 A * | 1/1998 | Jung | 382/232 |
| 5,828,406 A * | 10/1998 | Parulski et al. | 348/220.1 |
| 5,852,470 A * | 12/1998 | Kondo et al. | 348/448 |
| 5,956,468 A * | 9/1999 | Ancin | 358/1.9 |
| 6,069,973 A * | 5/2000 | Lin et al. | 382/167 |
| 6,130,420 A * | 10/2000 | Tanaka et al. | 250/208.1 |
| 6,204,879 B1 * | 3/2001 | Koseki et al. | 348/230.1 |
| 6,539,125 B1 * | 3/2003 | Harrington | 382/262 |
| 6,593,965 B1 * | 7/2003 | Miyamoto | 348/280 |
| 6,625,325 B2 * | 9/2003 | Gindele et al. | 382/260 |
| 6,686,960 B2 * | 2/2004 | Iizuka | 348/273 |
| 6,744,929 B1 * | 6/2004 | Okada | 382/251 |
| 6,755,247 B2 * | 6/2004 | Moake et al. | 166/250.07 |
| 6,816,166 B2 * | 11/2004 | Shimizu et al. | 345/581 |
| 6,816,197 B2 * | 11/2004 | Keshet et al. | 348/273 |
| 6,894,721 B1 * | 5/2005 | Okada et al. | 348/229.1 |
| 6,897,983 B1 * | 5/2005 | Kawano | 358/3.26 |
| 6,970,268 B1 * | 11/2005 | Shin et al. | 358/1.9 |
| 6,992,706 B2 * | 1/2006 | Mabuchi et al. | 348/220.1 |
| 6,992,714 B1 * | 1/2006 | Hashimoto et al. | 348/273 |
| 7,053,948 B2 * | 5/2006 | Konishi | 348/311 |
| 7,057,657 B1 * | 6/2006 | Ishihara et al. | 348/312 |
| 7,123,299 B1 * | 10/2006 | Yoshida et al. | 348/277 |
| 7,215,823 B2 * | 5/2007 | Miura et al. | 382/268 |
| 7,242,432 B2 * | 7/2007 | Watanabe | 348/333.11 |
| 7,493,255 B2 * | 2/2009 | Al-Naimi et al. | 704/219 |
| 2001/0012063 A1 * | 8/2001 | Maeda | 348/222 |
| 2001/0020950 A1 * | 9/2001 | Shimizu et al. | 345/611 |
| 2002/0001409 A1 * | 1/2002 | Chen et al. | 382/167 |
| 2002/0051007 A1 * | 5/2002 | Kitagawa et al. | 345/660 |
| 2002/0184276 A1 * | 12/2002 | Acharya | 708/308 |
| 2003/0095717 A1 * | 5/2003 | Gindele et al. | 382/260 |
| 2005/0200723 A1 * | 9/2005 | Kondo et al. | 348/222.1 |
| 2007/0076104 A1 * | 4/2007 | Kondo et al. | 348/272 |

FOREIGN PATENT DOCUMENTS

| | | |
|---|---|---|
| EP | 1 017 230 | 7/2000 |
| JP | 2-95093 | 4/1990 |
| JP | 2000-253415 | 9/2000 |
| JP | 2001-245141 | 9/2001 |
| WO | WO 9607275 A1 * | 3/1996 |

* cited by examiner

FREQUENCY BAND BEFORE EXTRACTION (1,0,1,0,1)/3 LPF

☐ : GREEN
☒ : RED
▨ : BLUE

IMAGE PROCESSING SYSTEM, IMAGE PROCESSING METHOD, IMAGE PROCESSING RECORDING MEDIUM, AND PROGRAM SUITABLE FOR EXTRACTION PROCESSING

TECHNICAL FIELD

The present invention relates to apparatuses and methods for image processing, recording media, and programs, and in particular, relates to apparatuses and methods for image processing, recording media and programs suitable for extraction processing.

BACKGROUND ART

An image-pickup device converting light into electrical signals provided for, for example, digital cameras such as digital still cameras, digital video cameras, and digital cameras that can record both still and moving images, includes microscopic photodiodes disposed in rows and columns on the surface of the device chip. The photodiodes are semiconductors generating electrical charges in response to the strength of radiated light. Since the photodiodes themselves cannot distinguish colors, color components of the radiated light needs to be received to capture color images.

A single-chip color image-pickup device provided for common digital cameras or video cameras includes three-color or four-color filters disposed in a mosaic pattern on the photodiodes, so that each of the photodiodes responds to the respective color component. The cameras that utilize RGB color filters disposed in a mosaic pattern, in other words, which capture images with a single-chip image-pickup device, are referred to as single-chip cameras in contrast to, for example, three-chip cameras that utilize three separate image-pickup devices for RGB (red, green, and blue, i.e. the three primary colors of light).

A CCD (charge coupled device) and a CMOS (complementary metal-oxide semiconductor) sensor, for example, are the prevailing sensors employed as the image-pickup device.

CCD originally indicated overall devices having a function of transmitting electrical charges in a bucket-brigade fashion, but nowadays, CCD in general indicates a CCD image-pickup device utilizing a CCD for reading out the electrical charges. The CCD is widely employed in imaging devices such as digital cameras and image scanners that capture images.

The CCD image-pickup device is composed of photodiodes and circuits successively extracting and transmitting electrical charges generated by the photodiodes. Specifically, the CCD image-pickup device includes the photodiodes and electrodes disposed in a grid pattern on a silicon substrate (the number of the grid sections corresponds to the number of pixels of the CCD). As in the case of film, when optical images are focused at the sections of the grid through lenses, each of the photodiodes generates electrical charges in response to the strength of received light. By alternately applying voltages to the electrodes, the accumulated electrical charges move to the adjacent electrodes as if the electrical charges are pushed by a pump, and are finally output one by one. Amplifying this output and converting it into digital values generates two-dimensional image data. For moving images, this process is endlessly repeated to generate moving images as successive still images.

The CMOS sensor is an image-pickup device provided with a CMOS switch for reading out the electrical charges instead of a CCD, and each of the pixels is composed of a photodiode and a switch utilizing a CMOS transistor. That is to say, the photodiodes disposed in a grid pattern are individually provided with a switch, and the electrical charges are read out at each pixel by changing over the switches in turn. This structure can provide various advantages. For example, smears, which are peculiar to the CCD, do not occur in theory, power consumption is low (approximately one-tenth of the CCD), and a single low-voltage can drive the CMOS sensor. Furthermore, since production lines for general chips can be utilized to produce the CMOS sensor together with peripheral functions as one chip, the CMOS sensor can be made smaller with lower costs. However, measures for noise caused by, for example, switching are required for practical application of the CMOS sensor as an image-pickup device.

The number of sensors on a solid-state image-pickup device, i.e. the number of pixels of captured images, for digital video cameras is one million pixels or less in most cases. Meanwhile, for digital still cameras, the number of pixels is increasing from one million or two million, to three million due to improvements in recent semiconductor technology and higher resolution.

Moreover, digital cameras that can record both still and moving images have been developed and come into widespread use in recent years.

However, the time required for reading out all the pixels becomes longer as the number of pixels of the captured images increases. Unlike the still images, when the readout time for moving images becomes long, smooth moving images cannot be produced.

To solve this problem, readout methods in which only some of the pixels are extracted are available when high resolution is not required.

So far, especially when a CCD is employed as an image-pickup device, some extracting methods are employed to display moving images and the like. For example, for 2×2 pixels (four pixels of Gr, R, B, and Gb), in the method shown in FIG. 1, only two pixels are extracted from eight pixels and the rest of the pixels are decimated, or, in the method shown in FIG. 2, only two pixels are extracted from twelve pixels and the rest of the pixels are decimated.

However, since the methods shown in FIGS. 1 and 2 cannot extract the pixels at even intervals, and moreover, do not utilize all the pixels, aliasing occurs in the displayed or recorded moving images.

DISCLOSURE OF INVENTION

In consideration of the above-described situation, the present invention provides extraction processing achieving extracted images in good condition without aliasing.

The image-processing apparatuses according to the present invention include acquiring means for acquiring image signals composed of multiple color components of a 2×2 color-coding array; filtering means for calculating the average of pixel values of any (2n−1) pixels, each including a target pixel and the adjacent pixels having the same color component as that of the target pixel, from the image signals acquired by the acquiring means, and defining the average as a pixel value of the target pixel; and extracting means for extracting the pixel having the average calculated by the filtering means as the pixel value at an extraction rate of 1/(2n−1).

The filtering means may calculate the averages of pixel values for all the pixels in a frame of the image signals.

The filtering means may select pixels having the same color component as that of the target pixel and aligned along the horizontal direction with respect to the target pixel, calculate the average of the pixel values of the (2n−1) pixels, and define the average as the pixel value of the target pixel.

The filtering means may select pixels having the same color component as that of the target pixel and aligned along the vertical direction with respect to the target pixel, calculate the average of the pixel values of the (2n−1) pixels, and define the average as the pixel value of the target pixel.

The filtering means may select pixels having the same color component as that of the target pixel disposed in a predetermined range in the horizontal and vertical directions with respect to the target pixel, calculate the average of the pixel values of the (2n−1) pixels, and define the average as the pixel value of the target pixel.

For the target pixel for at least one of the multiple color components, the filtering means may select pixels having the same color component as that of the target pixel in ascending order of distance from the target pixel, calculate the average of the pixel values of the (2n−1) pixels, and define the average as the pixel value of the target pixel.

For each of the target pixels for all the multiple color components, the filtering means may select pixels having the same color component as that of the target pixel in ascending order of distance from the target pixel, calculate the average of the pixel values of the (2n−1) pixels, and define the average as the pixel value of the target pixel.

The acquiring means may further include image-capturing means for capturing the image signals.

The image-capturing means may comprise a CMOS IC.

The image-capturing means, the filtering means, and the extracting means may be integrated in a single CMOS IC.

The image-processing apparatus may further include displaying means for displaying images corresponding to the image signals acquired by the acquiring means. When the images displayed by the displaying means are moving images, the image signals acquired by the acquiring means may be processed by the filtering means and the extracting means, and then displayed by the displaying means. When the images displayed by the displaying means are still images, the image signals acquired by the acquiring means may be displayed by the displaying means without being processed by the filtering means and the extracting means.

The image-processing apparatuses may further include recording means for recording the image signals acquired by the acquiring means. When the image signals recorded in the recording means are signals corresponding to moving images, the image signals acquired by the acquiring means may be processed by the filtering means and the extracting means, and then recorded in the recording means. When the image signals recorded in the recording means are signals corresponding to still images, the image signals acquired by the acquiring means may be recorded in the recording means without being processed by the filtering means and the extracting means.

The image-processing apparatuses may further include outputting means for outputting the image signals acquired by the acquiring means. When the image signals output from the outputting means are signals corresponding to moving images, the image signals acquired by the acquiring means may be processed by the filtering means and the extracting means, and then output from the outputting means. When the image signals output from the outputting means are signals corresponding to still images, the image signals acquired by the acquiring means may be output from the outputting means without being processed by the filtering means and the extracting means.

The image-processing methods according to the present invention include an acquisition-controlling step for controlling the acquisition of image signals composed of multiple color components of a 2×2 color-coding array; a filtering step for calculating the average of pixel values of any (2n−1) pixels, each including a target pixel and the adjacent pixels having the same color component as that of the target pixel, from the image signals whose acquisition is controlled by a process in the acquisition-controlling step, and defining the average as a pixel value of the target pixel; and an extracting step for extracting the pixel having the average calculated by a process in the filtering step as the pixel value at an extraction rate of 1/(2n−1).

The programs recorded in the recording media according to the present invention include an acquisition-controlling step for controlling the acquisition of image signals composed of multiple color components of a 2×2 color-coding array; a filtering step for calculating the average of pixel values of any (2n−1) pixels, each including a target pixel and the adjacent pixels having the same color component as that of the target pixel, from the image signals whose acquisition is controlled by a process in the acquisition-controlling step, and defining the average as a pixel value of the target pixel; and an extracting step for extracting the pixel having the average calculated by a process in the filtering step as the pixel value at an extraction rate of 1/(2n−1).

The programs according to the present invention include an acquisition-controlling step for controlling the acquisition of image signals composed of multiple color components of a 2×2 color-coding array; a filtering step for calculating the average of pixel values of any (2n−1) pixels, each including a target pixel and the adjacent pixels having the same color component as that of the target pixel, from the image signals whose acquisition is controlled by a process in the acquisition-controlling step, and defining the average as a pixel value of the target pixel; and an extracting step for extracting the pixel having the average calculated by a process in the filtering step as the pixel value at an extraction rate of 1/(2n−1).

According to the apparatus and the method for image processing and to the program of the present invention, image signals composed of multiple color components of a 2×2 color-coding array are acquired, the average of pixel values of any (2n−1) pixels, each including a target pixel and the adjacent pixels having the same color component as that of the target pixel, is calculated from the acquired image signals, the average is defined as a pixel value of the target pixel, and the pixel having the calculated average as the pixel value is extracted at an extraction rate of 1/(2n−1).

BEST MODE FOR CARRYING OUT THE INVENTION

Embodiments of the present invention will now be described with reference to the drawings.

Figure 1:
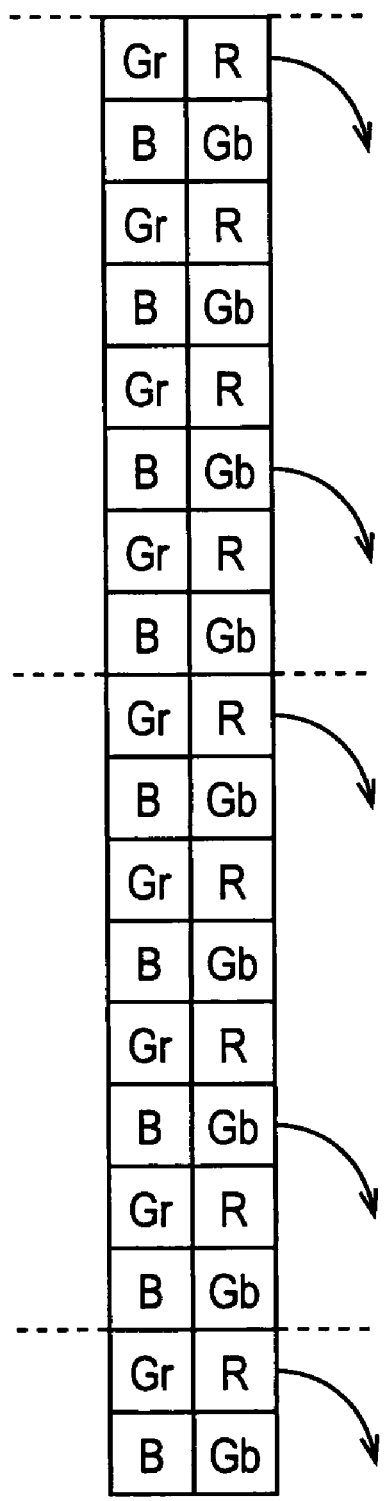
FIG. 1 illustrates ⅛ extraction in the vertical direction according to a known technology.
Figure 2:
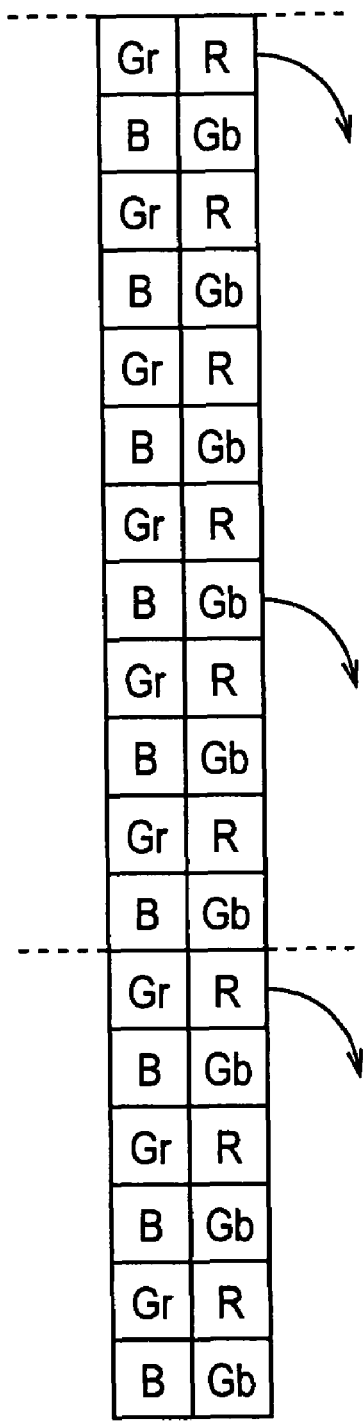
FIG. 2 illustrates 2/12 extraction in the vertical direction according to a known technology.
Figure 3:
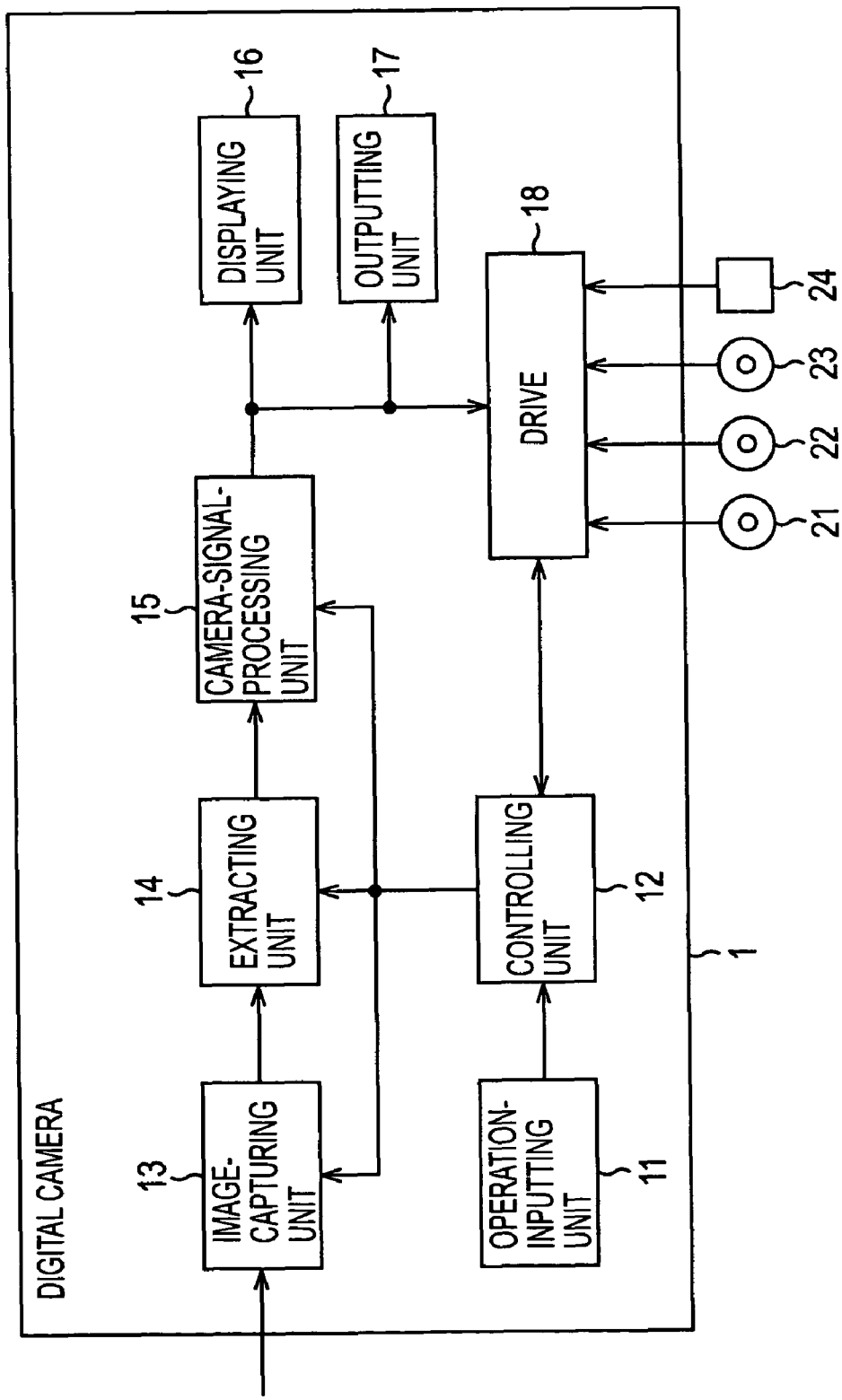
FIG. 3 is a block diagram illustrating the structure of a video camera to which the present invention is applied.

FIG. 3 is a block diagram illustrating the structure of a digital camera to which the present invention is applied.

An operation-inputting unit 11 is composed of, for example, buttons, keys, and jog dials, and receives operational inputs provided by users for capturing still images, starting and stopping video image recordings, and adjusting images for exposure, focusing, and the like.

A controlling unit 12 is composed of a CPU (central processing unit), a ROM (read only memory), and a RAM (random access memory), and controls operations of a digital camera 1 by generating control signals for controlling an image-capturing unit 13, an extracting unit 14, a camera-signal-processing unit 15, and a drive 18, and by outputting the control signals to the corresponding units on the basis of the user operations input through the operation-inputting unit 11.

The image-capturing unit 13 is composed of, for example, optical lenses, driving units for driving the optical lenses, an image-pickup device such as a CCD sensor or a CMOS sensor, and an A/D converter for converting analog electrical signals captured by the image-pickup device into digital signals. The image-capturing unit 13 captures still or moving images according to the control of the controlling unit 12.

According to the control of the controlling unit 12, the extracting unit 14 extracts image signals input from the image-capturing unit 13, if necessary.

The image-capturing unit 13 and the extracting unit 14 may be separate processing blocks, or may be structured as one chip (for example, the image-capturing unit 13 and the extracting unit 14 are integrated in one CMOS IC).

The camera-signal-processing unit 15 performs processing such as γ processing, white balancing, and de-mosaicing on the input image data according to the control of the controlling unit 12.

A displaying unit 16 is composed of, for example, a liquid-crystal panel, and displays the input image data. The displaying unit 16 functions as a viewfinder for checking the images to be captured, and displays the captured still images or the recorded moving images according to the user operations input through the operation-inputting unit 11. An outputting unit 17 is connected with other apparatuses or networks by wire or wireless to output the captured still images or the recorded moving images.

The drive 18 is loaded with a magnetic disk 21, an optical disk 22, a magneto-optical disk 23, a semiconductor memory 24, or the like, as appropriate. The drive 18 outputs and records the image signals supplied by the camera-signal-processing unit 15 onto the magnetic disk 21, the optical disk 22, the magneto-optical disk 23, the semiconductor memory 24, or the like; outputs and displays the still or moving image data recorded on the magnetic disk 21, the optical disk 22, the magneto-optical disk 23, the semiconductor memory 24, or the like on the displaying unit 16; or outputs the image data to other apparatuses from the outputting unit 17.

The drive 18 may be loaded with a magnetic tape. Moreover, besides the drive 18, recording media such as a semiconductor memory and a hard disk may be provided inside the digital camera 1 to record the captured image data inside the digital camera 1.

Programs read out from the recording media such as the magnetic disk 21, the optical disk 22, the magneto-optical disk 23, or the semiconductor memory 24 loaded in the drive 18 are supplied to and installed in the controlling unit 12, if required.

When a user operates the operation-inputting unit 11 to display images capturable by the image-capturing unit 13 on the displaying unit 16, in other words, when the displaying unit 16 is used as a viewfinder, the controlling unit 12 controls the image-capturing unit 13 to successively capture image data and output the image data to the extracting unit 14. According to the control of the controlling unit 12, the extracting unit 14 performs extraction and outputs the extracted image data to the camera-signal-processing unit 15. The extraction will be described in detail below. The camera-signal-processing unit 15 performs a predetermined processing on the extracted image data supplied from the extracting unit 14 to output and display the image data on the displaying unit 16.

Due to the extraction, the time required for reading out the image data can be reduced, and thus the motion of the moving images displayed on the displaying unit 16 can be smooth.

When the user checks the images displayed on the displaying unit 16 and issues an order to capture a still image through the operation-inputting unit 11, the controlling unit 12 controls the image-capturing unit 13 to capture a frame of image data and output the image data to the extracting unit 14. According to the control of the controlling unit 12, the extracting unit 14 outputs the image data composed of all the pixels to the camera-signal-processing unit 15 without decimating the image data. The camera-signal-processing unit 15 performs a predetermined processing on the frame of the undecimated image data supplied from the extracting unit 14 to output and display the image data on the displaying unit 16, and to output and record the image data onto the predetermined recording media loaded in the drive 18.

Since the image data is not decimated, high-resolution images are recorded onto the predetermined recording media loaded in the drive 18.

When the user checks the images displayed on the displaying unit 16 and issues an order to capture moving images through the operation-inputting unit 11, the controlling unit 12 controls the image-capturing unit 13 to successively capture image data and output the image data to the extracting unit 14. According to the control of the controlling unit 12, the extracting unit 14 performs the extraction and outputs the extracted image data to the camera-signal-processing unit 15. The camera-signal-processing unit 15 performs a predetermined processing on the extracted image data supplied from the extracting unit 14 to output and display the image data on the displaying unit 16, and to output and record the image data onto the predetermined recording media loaded in the drive 18.

Due to the extraction, the time required for reading out the image data can be reduced, and thus the moving images can be recorded onto the predetermined recording media loaded in the drive 18.

The user can output and display the still or moving image data recorded on the predetermined recording media loaded in the drive 18 on the displaying unit 16, or can output the image data to other apparatuses from the outputting unit 17 by operating the operation-inputting unit 11.

The digital camera 1 may include a microphone for recording audio data, an audio-data-processing unit for processing the recorded audio data, a speaker for outputting the audio data, and the like.

Figure 4:
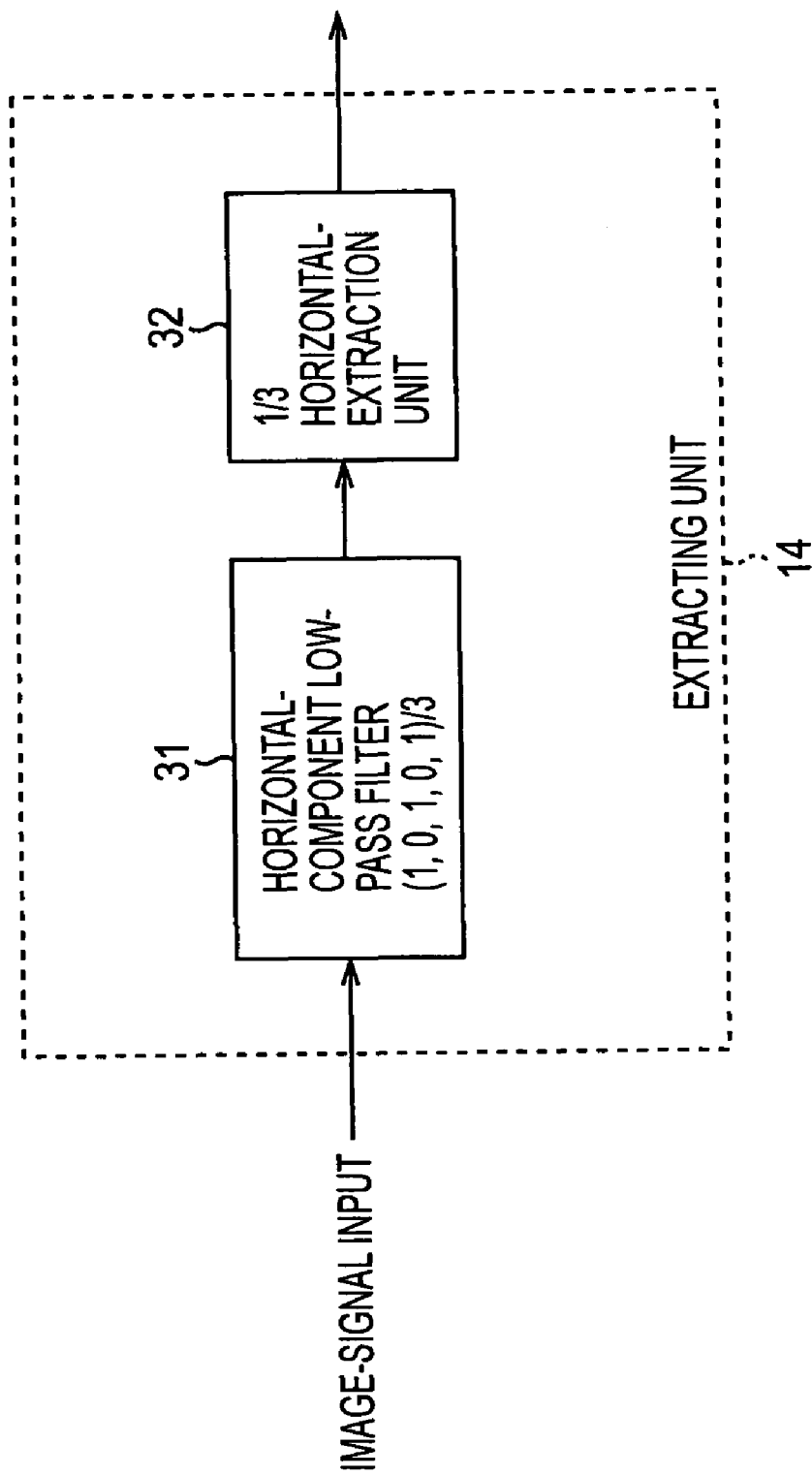
FIG. 4 is a block diagram illustrating a more detailed structure of the extracting unit shown in FIG. 3.

FIG. 4 is a block diagram illustrating a more detailed structure of the extracting unit 14.

A horizontal-component low-pass filter 31 subjects the input image signals to (1, 0, 1, 0, 1)/3 filtering in the horizontal direction. A ⅓ horizontal-extraction unit 32 resamples (extracts) every third pixel in the horizontal direction.

Figure 5:
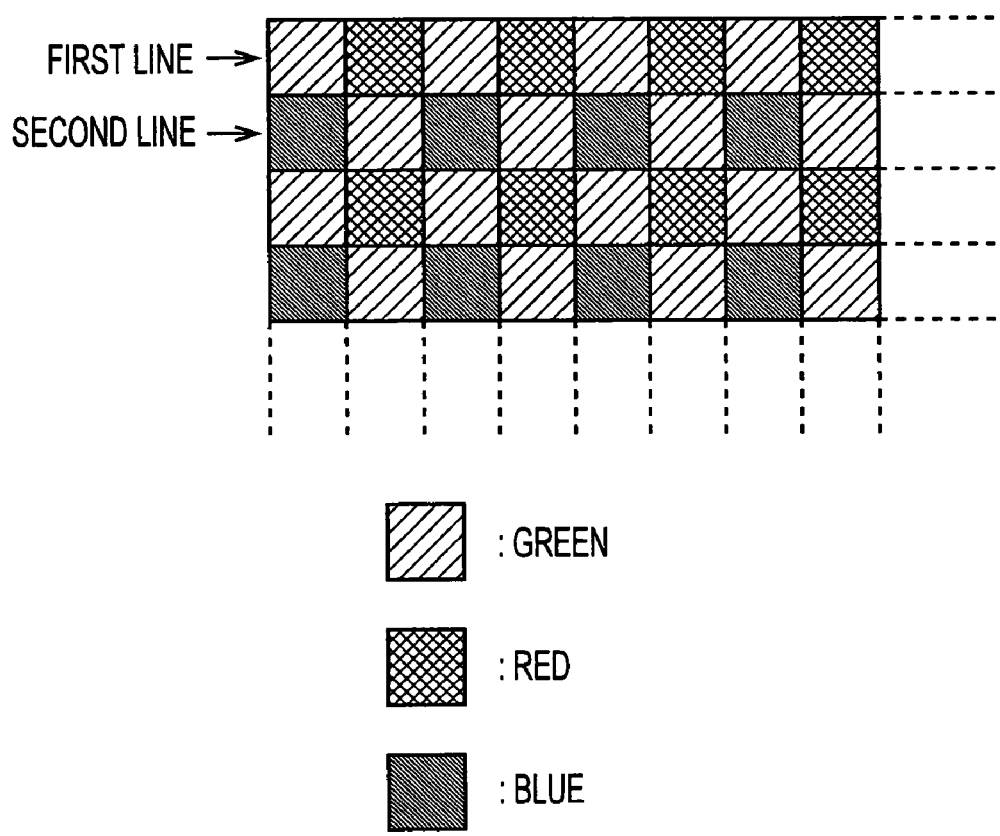
FIG. 5 illustrates the Bayer array.

For example, filtering and resampling utilizing a color-coding array shown in FIG. 5 will now be described with reference to FIG. 6. In the color-coding array, green and red components are disposed in the first line and blue and green components are disposed in the second line, in other words, color filters are arranged in the so-called 2×2 Bayer array (G (green) checkered array).

In the first line, pixels corresponding to the positions of the green filters (referred to as green pixels hereafter) and pixels corresponding to the positions of the red filters (referred to as red pixels hereafter) are alternately disposed. When the horizontal-component low-pass filter 31 performs the (1, 0, 1, 0, 1)/3 filtering with one of the green pixels as a target pixel, portions corresponding to three green pixels including the target pixel are multiplied by 1, portions corresponding to red pixels are multiplied by 0, and the sum of the pixel values is divided by 3. As a result, a simple average of the target green pixel and the adjacent green pixels is calculated.

Meanwhile, when the horizontal-component low-pass filter 31 performs the (1, 0, 1, 0, 1)/3 filtering with one of the red pixels as a target pixel, portions corresponding to three red pixels including the target pixel are multiplied by 1, portions corresponding to green pixels are multiplied by 0, and the sum of the pixel values is divided by 3. As a result, a simple average of the target red pixel and the adjacent red pixels is calculated.

Similarly, the horizontal-component low-pass filter 31 filters green pixels and pixels corresponding to the positions of the blue filters (referred to as blue pixels hereafter) in the second line.

Figure 6:
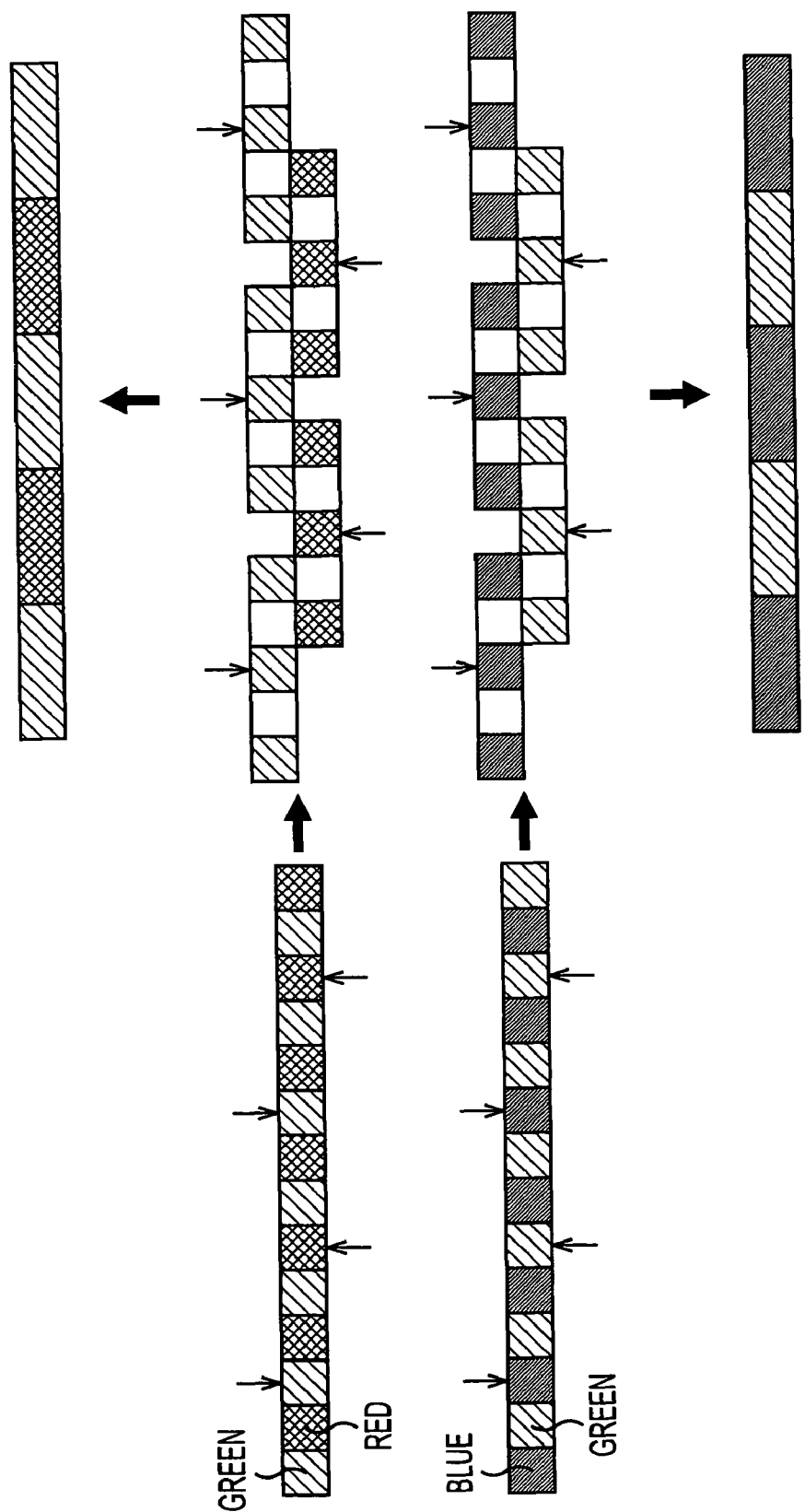
FIG. 6 illustrates a process performed by the extracting unit shown in FIG. 4.

Every third pixel of horizontal components is then extracted in the ⅓ horizontal-extraction unit 32 to finally generate an extracted-pixel group composed of pixels each having the simple-average value of every third pixel, indicated by arrows shown in FIG. 6, as a target pixel and the adjacent pixels of the same color.

In FIG. 6, pixels filtered when the green pixels are defined as the target pixels and when the red pixels are defined as the target pixels are separately illustrated in the upper row and in the lower row, respectively, and pixels filtered when the blue pixels are defined as the target pixels and when the green pixels are defined as the target pixels are separately illustrated in the upper row and in the lower row, respectively. However, the horizontal-component low-pass filter 31 can simultaneously process the same lines.

Figure 7:
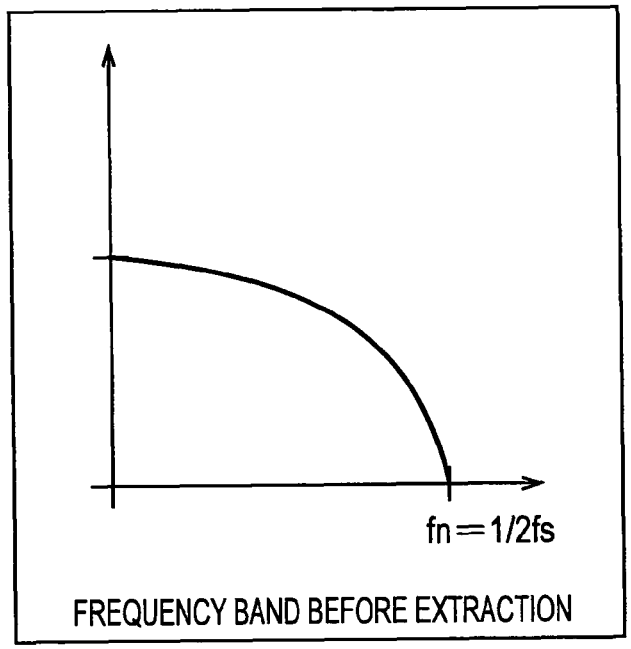
FIG. 7 illustrates a frequency band of an image input to the extracting unit shown in FIG. 4.

FIG. 7 illustrates a frequency band of an image before the image is input to the extracting unit 14. The Nyquist threshold frequency fn of the pre-extracted image is half the sampling frequency fs of the pre-extracted image.

Figure 8:
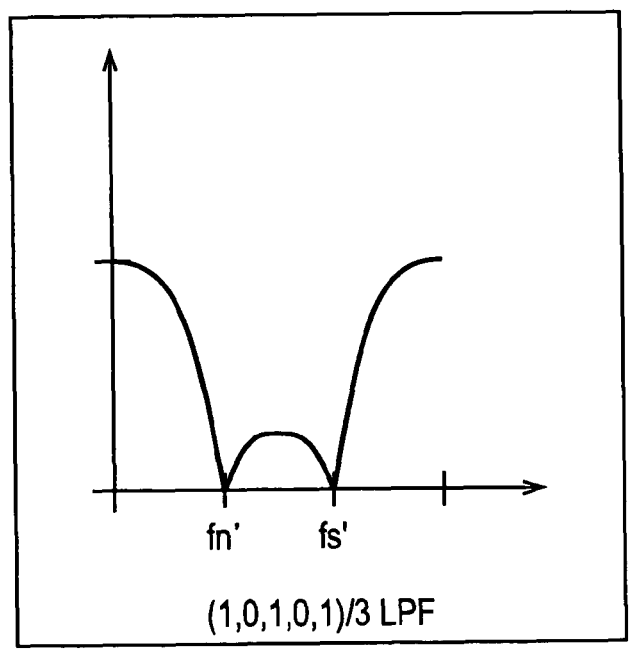
FIG. 8 illustrates the frequency band of the image filtered by the extracting unit shown in FIG. 4.
Figure 9:
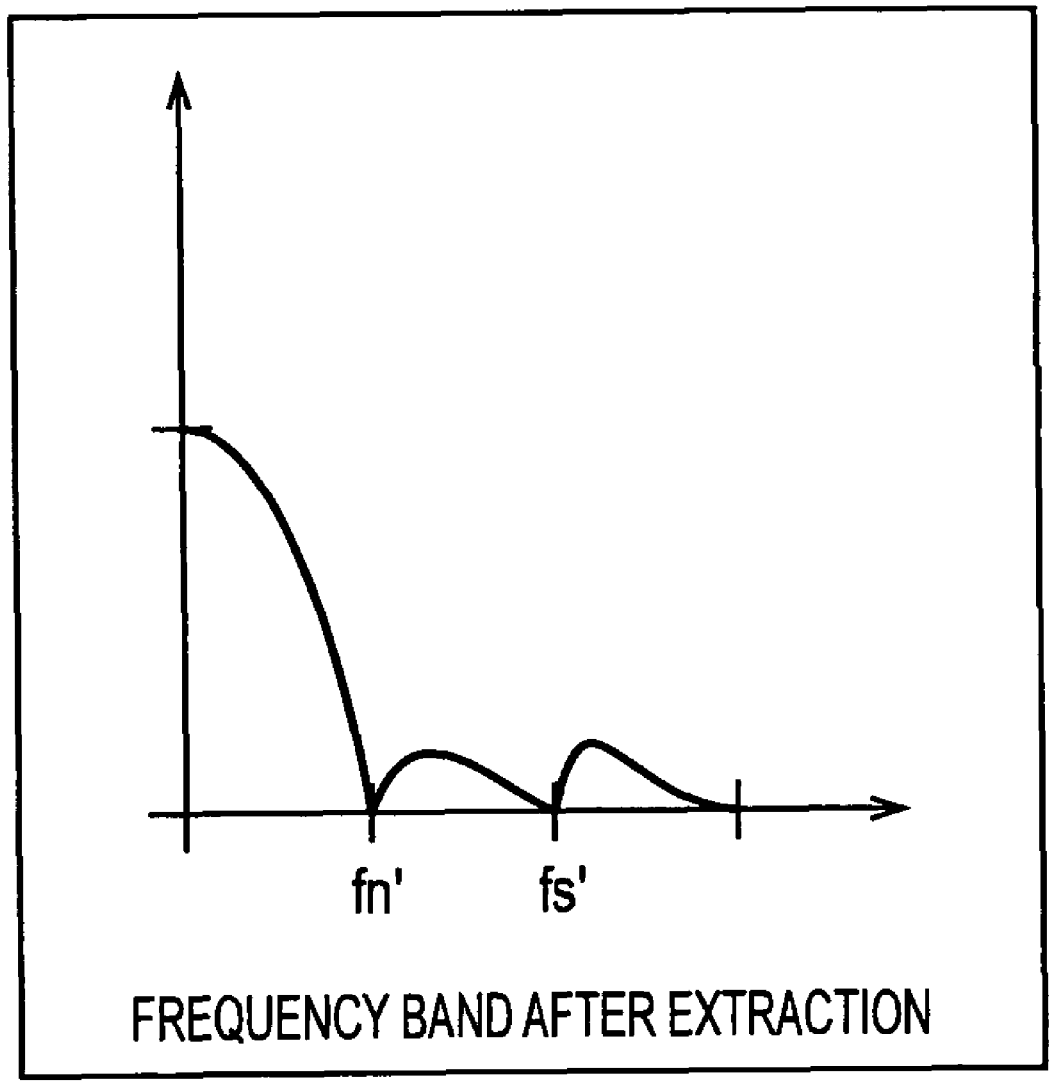
FIG. 9 illustrates the frequency band of the image output from the extracting unit shown in FIG. 4.

FIG. 8 illustrates the frequency band after the pre-extracted image is subjected to the (1, 0, 1, 0, 1)/3 filtering in the horizontal-component low-pass filter 31. FIG. 9 illustrates the frequency band after the image is extracted in the ⅓ horizontal-extraction unit 32.

In FIGS. 8 and 9, both the values of the Nyquist threshold frequency fn' and the sampling frequency fs' are appropriately limited compared to that before the image is input to the extracting unit 14 described with reference to FIG. 7, and furthermore, these sampling points are at even intervals.

That is to say, in known methods for extracting images, almost all of the pixels are not utilized but only a part of the pixels are utilized for generating extracted images. However, the extracting unit 14 can generate extracted images having substantially no phase shifts and very small aliasing therein by filtering all the pixels and extracting the pixels at even intervals.

As stated above, in the extracting unit 14, the pre-extracted images are subjected to the (1, 0, 1, 0, 1)/3 filtering in the horizontal-component low-pass filter 31, and then are decimated to one-third in the ⅓ horizontal-extraction unit 32. However, any filters can be employed as long as the filters can generate a trap point at the sampling frequency fs' after the extraction, can appropriately limit the frequency band at the Nyquist threshold frequency fn', and the extracted images have substantially no phase shifts therein.

Figure 10:
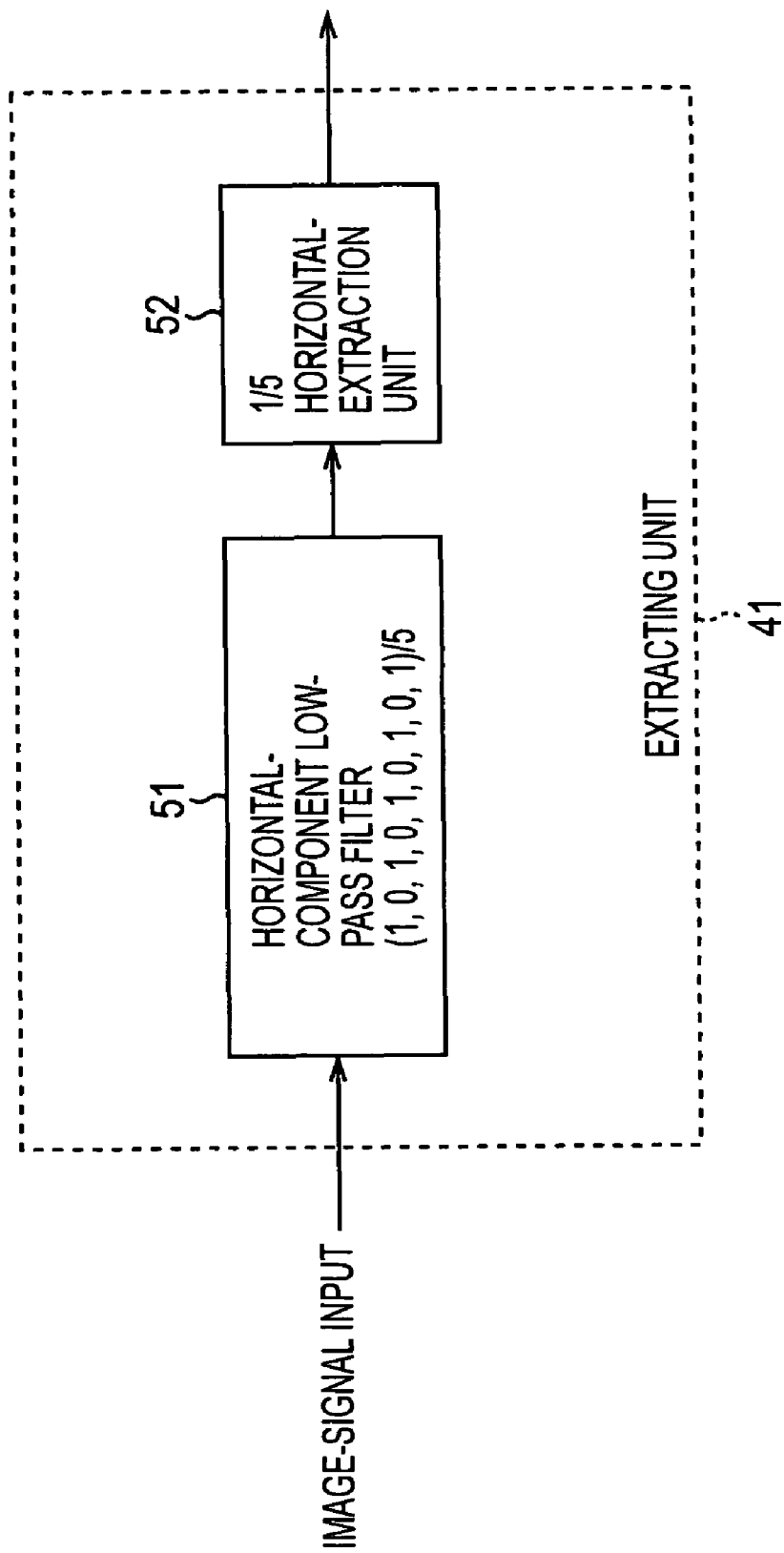
FIG. 10 is a block diagram illustrating another structure of the extracting unit.

For example, besides the extraction rate of ⅓, this extracting method is viable when the extraction rate is 1/(2n−1) (where n is a positive integer). For example, in the digital camera 1 shown in FIG. 3, instead of the extracting unit 14, an extracting unit 41 shown in FIG. 10 may be employed.

A horizontal-component low-pass filter 51 subjects the input image signals to (1, 0, 1, 0, 1, 0, 1, 0, 1)/5 filtering in the horizontal direction. A ⅕ horizontal-extraction unit 52 resamples (extracts) every fifth pixel in the horizontal direction.

For example, filtering and resampling utilizing the color filters arranged in the 2×2 Bayer array illustrated with reference to FIG. 5 will now be described with reference to FIG. 11.

When the horizontal-component low-pass filter 51 performs the (1, 0, 1, 0, 1, 0, 1, 0, 1)/5 filtering with one of the green pixels as a target pixel in the first line, portions corresponding to five green pixels including the target pixel are multiplied by 1, portions corresponding to red pixels are multiplied by 0, and the sum of the pixel values is divided by 5. As a result, a simple average of the target green pixel and the adjacent green pixels is calculated.

Meanwhile, when the horizontal-component low-pass filter 51 performs the (1, 0, 1, 0, 1, 0, 1, 0, 1)/5 filtering with one of the red pixels as a target pixel, portions corresponding to five red pixels including the target pixel are multiplied by 1, portions corresponding to green pixels are multiplied by 0, and the sum of the pixel values is divided by 5. As a result, a simple average of the target red pixel and the adjacent red pixels is calculated.

Similarly, the horizontal-component low-pass filter 51 filters green pixels and blue pixels in the second line. Every fifth pixel of horizontal components is then extracted in the ⅕ horizontal-extraction unit 52 to finally generate an extracted-pixel group composed of pixels each having the simple-average value of every fifth pixel, indicated by arrows shown in FIG. 11, as a target pixel and the adjacent pixels of the same color.

Figure 11:
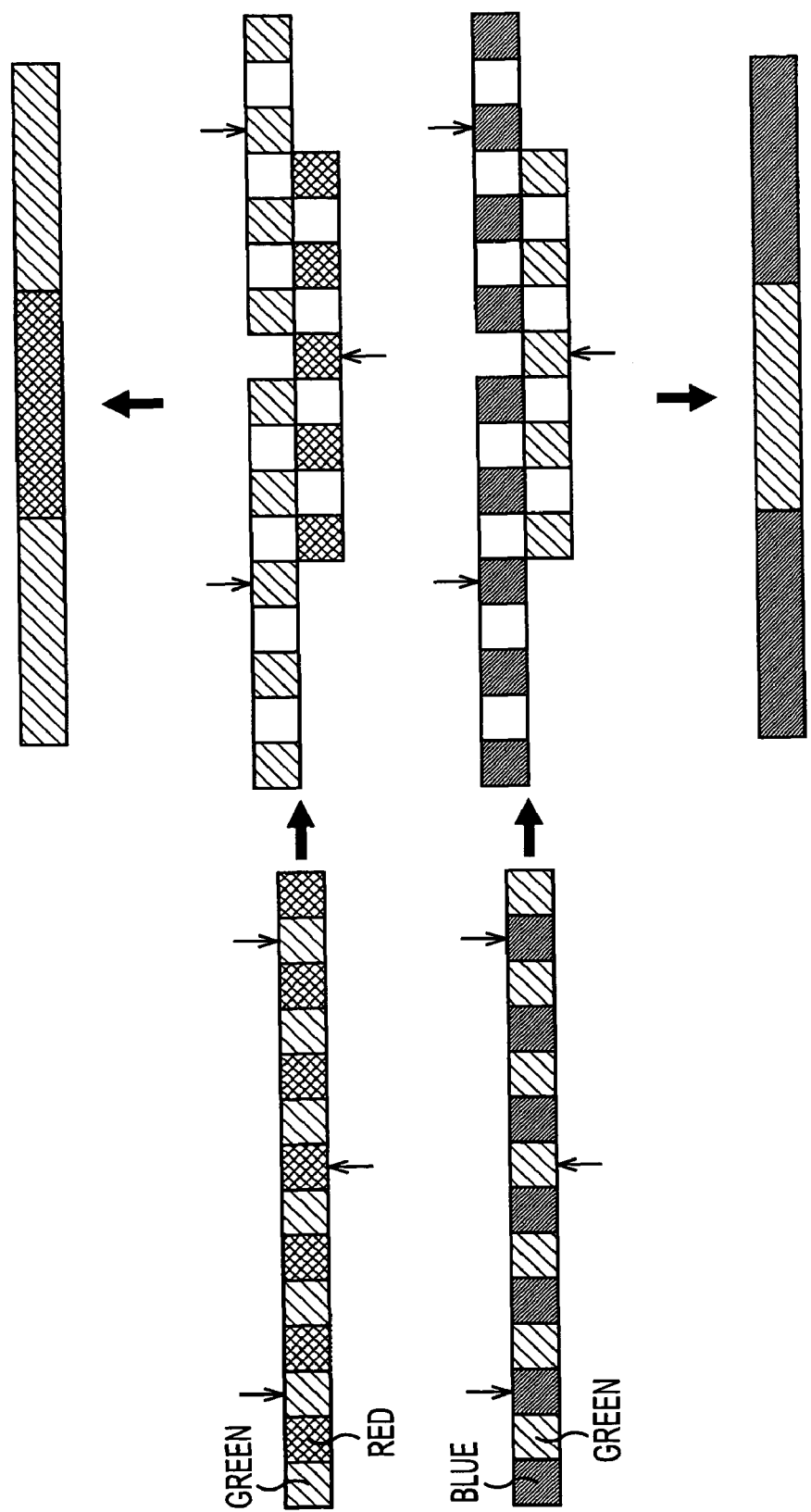
FIG. 11 illustrates a process performed by the extracting unit shown in FIG. 10.

In FIG. 11, pixels filtered when the green pixels are defined as the target pixels and when the red pixels are defined as the target pixels are separately illustrated in the upper row and in the lower row, respectively, and pixels filtered when the blue pixels are defined as the target pixels and when the green pixels are defined as the target pixels are separately illustrated in the upper row and in the lower row, respectively. However, the extracting unit 41 can simultaneously process the same lines.

For example, as in the case of the description with reference to FIG. 7, an instance when an image is input to the extracting unit 41 will now be described with reference to FIGS. 12 and 13. The Nyquist threshold frequency fn of the pre-extracted image is half the sampling frequency fs of the pre-extracted image.

Figure 12:
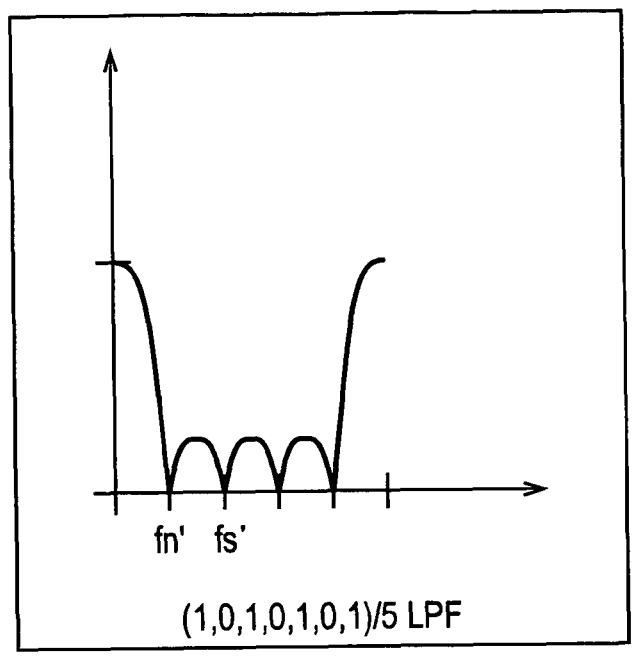
FIG. 12 illustrates a frequency band of an image filtered by the extracting unit shown in FIG. 10.
Figure 13:
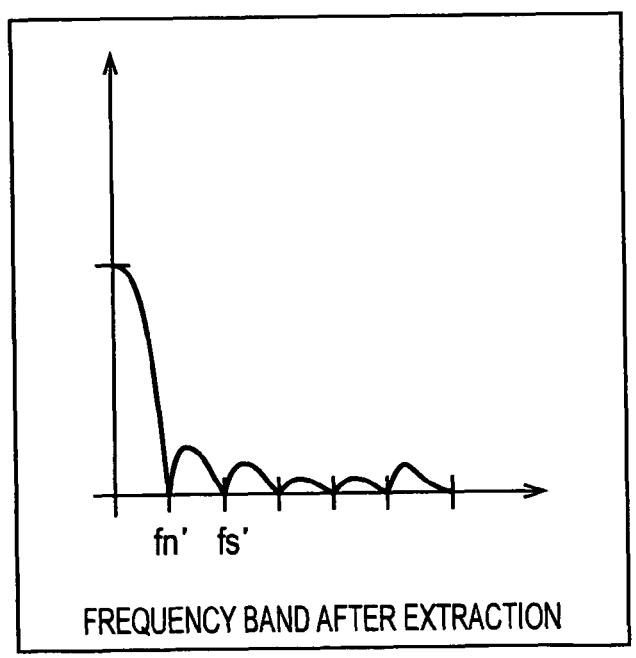
FIG. 13 illustrates the frequency band of the image output from the extracting unit shown in FIG. 10.

FIG. 12 illustrates the frequency band after the pre-extracted image is subjected to the (1, 0, 1, 0, 1, 0, 1, 0, 1)/5 filtering in the horizontal-component low-pass filter 51. FIG. 13 illustrates the frequency band after the image is extracted in the ⅕ horizontal-extraction unit 52.

In the frequency band after the filtering shown in FIG. 12 and in the frequency band after the extraction shown in FIG. 13, both the values of the Nyquist threshold frequency fn' and the sampling frequency fs' are appropriately limited compared to that of the pre-extracted image described with reference to FIG. 7, and furthermore, these sampling points are at even intervals.

Similar to the above-described extracting unit 14, the extracting unit 41 can generate extracted images having very small aliasing therein by filtering all the pixels and extracting the pixels at even intervals.

In this manner, when the extraction rate is 1/(2n−1) (where n is a positive integer), averaging the pixels of the same color (2n−1) adjacent to the target pixels and extracting the pixels can generate a trap point at the sampling frequency fs' after the extraction and can appropriately limit the frequency band at the Nyquist threshold frequency fn', and therefore, the extracted images have substantially no phase shifts therein. Furthermore, this extraction can generate extracted images having very small aliasing therein since all the pixels are utilized for the extraction.

Figure 14:
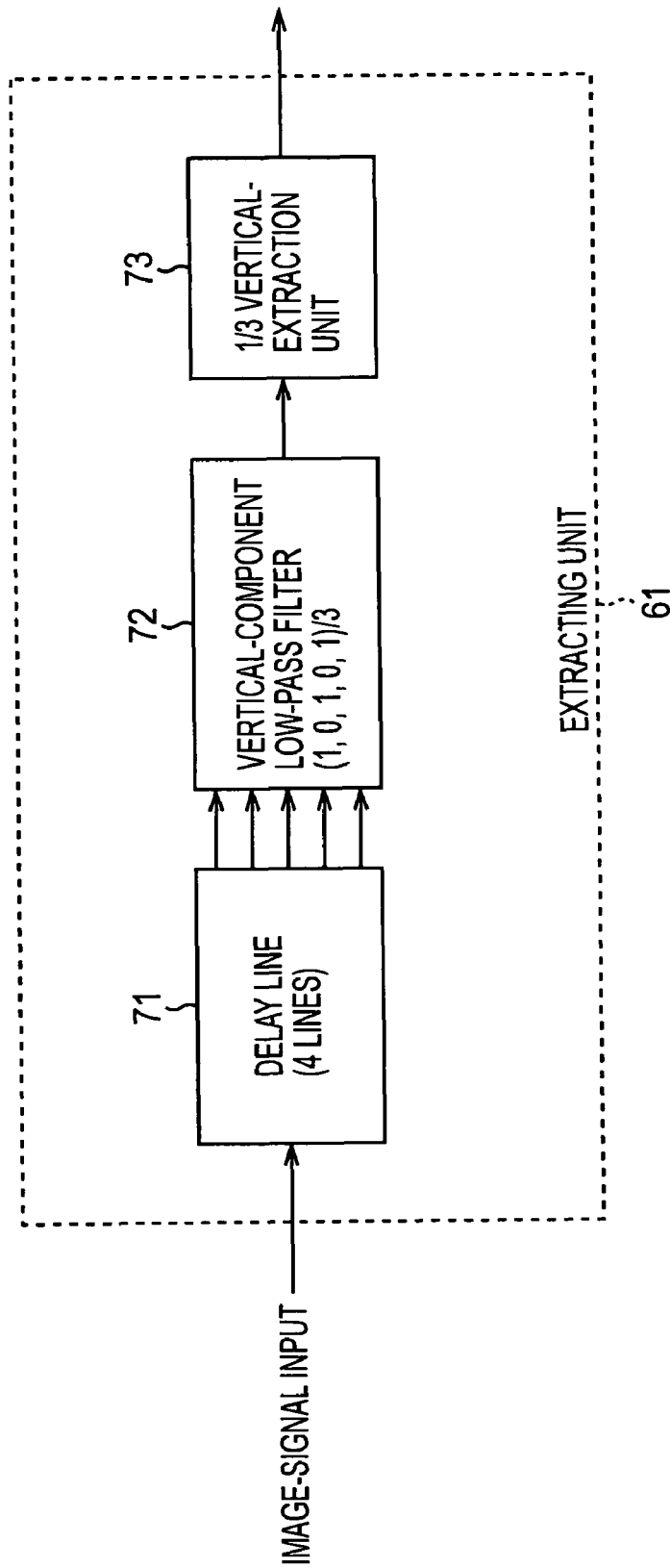
FIG. 14 is a block diagram illustrating another structure of the extracting unit.

This extraction can be performed not only in the horizontal direction but also in the vertical direction by employing an extracting unit 61 shown in FIG. 14, for example, instead of the extracting unit 14 in the digital camera 1 shown in FIG. 3.

Delay lines 71 are delay lines for four lines to synchronize image signals of five lines in the vertical direction. A vertical-component low-pass filter 72 subjects the input image signals to (1, 0, 1, 0, 1)/3 filtering in the vertical direction. A ⅓ vertical-extraction unit 73 resamples (extracts) every third pixel in the vertical direction.

For example, filtering and resampling utilizing the color filters arranged in the 2×2 Bayer array illustrated with reference to FIG. 5 will now be described with reference to FIG. 15.

In the first vertical line, green pixels and blue pixels are alternately disposed. In the second vertical line, red pixels and green pixels are alternately disposed. When the vertical-component low-pass filter 72 performs the (1, 0, 1, 0, 1)/3 filtering with one of the green pixels as a target pixel in the first vertical line, portions corresponding to green pixels are multiplied by 1, portions corresponding to red pixels are multiplied by 0, and the sum of pixel values of the three pixels including the target pixel is divided by 3. As a result, a simple average of the target green pixel and the adjacent green pixels is calculated.

Meanwhile, when the vertical-component low-pass filter 72 performs the (1, 0, 1, 0, 1)/3 filtering with one of the red pixels as a target pixel, portions corresponding to red pixels are multiplied by 1, portions corresponding to green pixels are multiplied by 0, and the sum of the pixel values of the three pixels including the target pixel is divided by 3. As a result, a simple average of the target red pixel and the adjacent red pixels is calculated.

Similarly, the vertical-component low-pass filter 72 filters green pixels and blue pixels in the second vertical line.

Figure 15:
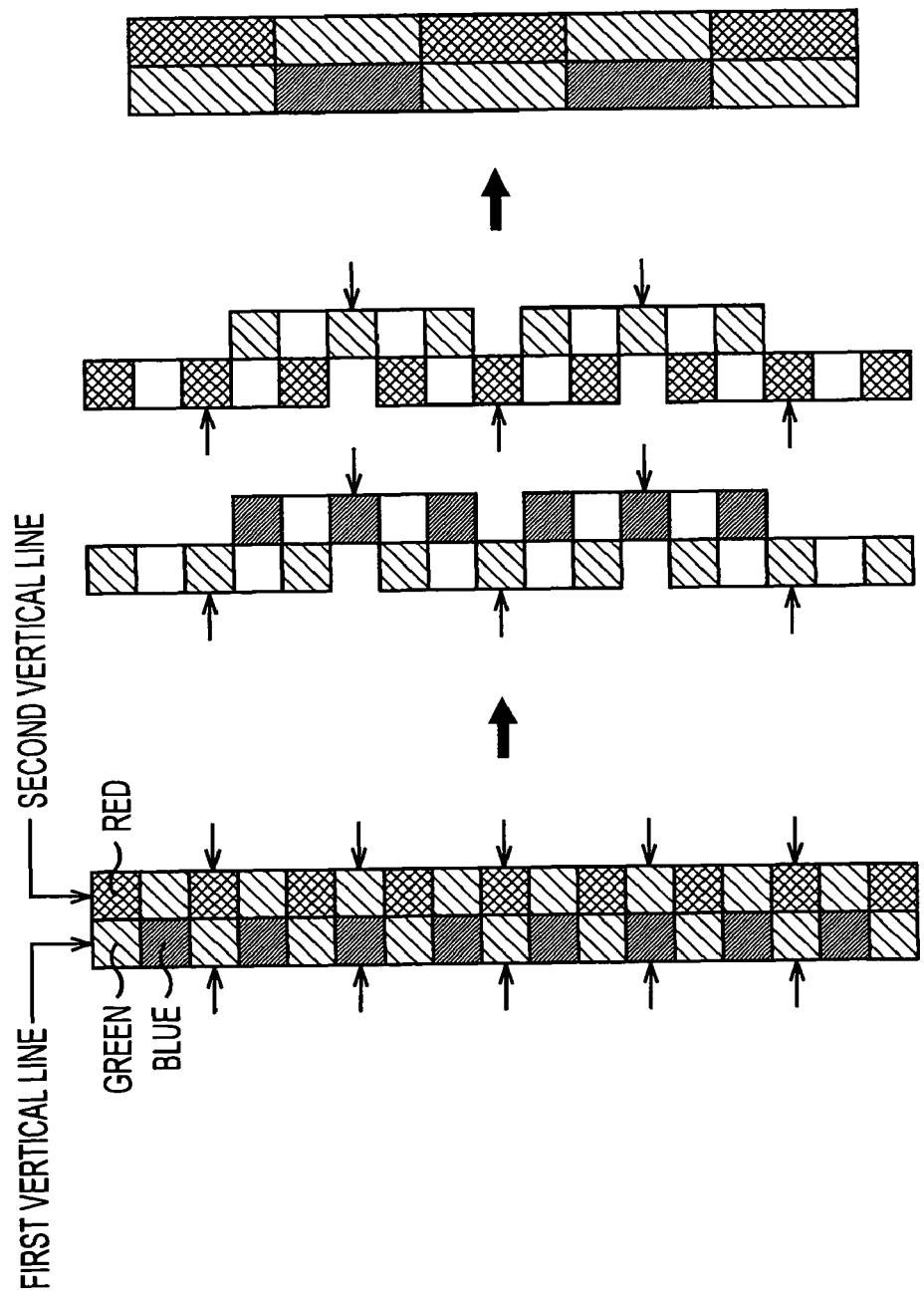
FIG. 15 illustrates a process performed by the extracting unit shown in FIG. 14.

Every third pixel of vertical components is then extracted in the ⅓ vertical-extraction unit 73 to finally generate an extracted-pixel group composed of pixels each having the simple-average value of every third pixel, indicated by arrows shown in FIG. 15, as a target pixel and the adjacent pixels of the same color.

In FIG. 15, pixels filtered when the green pixels are defined as the target pixels and when the red pixels are defined as the target pixels are separately illustrated in the right line and in the left line, respectively, and pixels filtered when the blue pixels are defined as the target pixels and when the green pixels are defined as the target pixels are separately illustrated in the right line and in the left line, respectively. However, the extracting unit 61 can simultaneously process the same vertical lines.

The vertical extraction processing, illustrated with reference to FIGS. 14 and 15, can also generate a trap point at the sampling frequency fs' after the extraction and can appropriately limit the frequency band at the Nyquist threshold frequency fn', and therefore, the extracted images have substantially no phase shifts therein. Furthermore, this extraction can generate extracted images having very small aliasing therein since all the pixels are utilized for the extraction.

Figure 16:
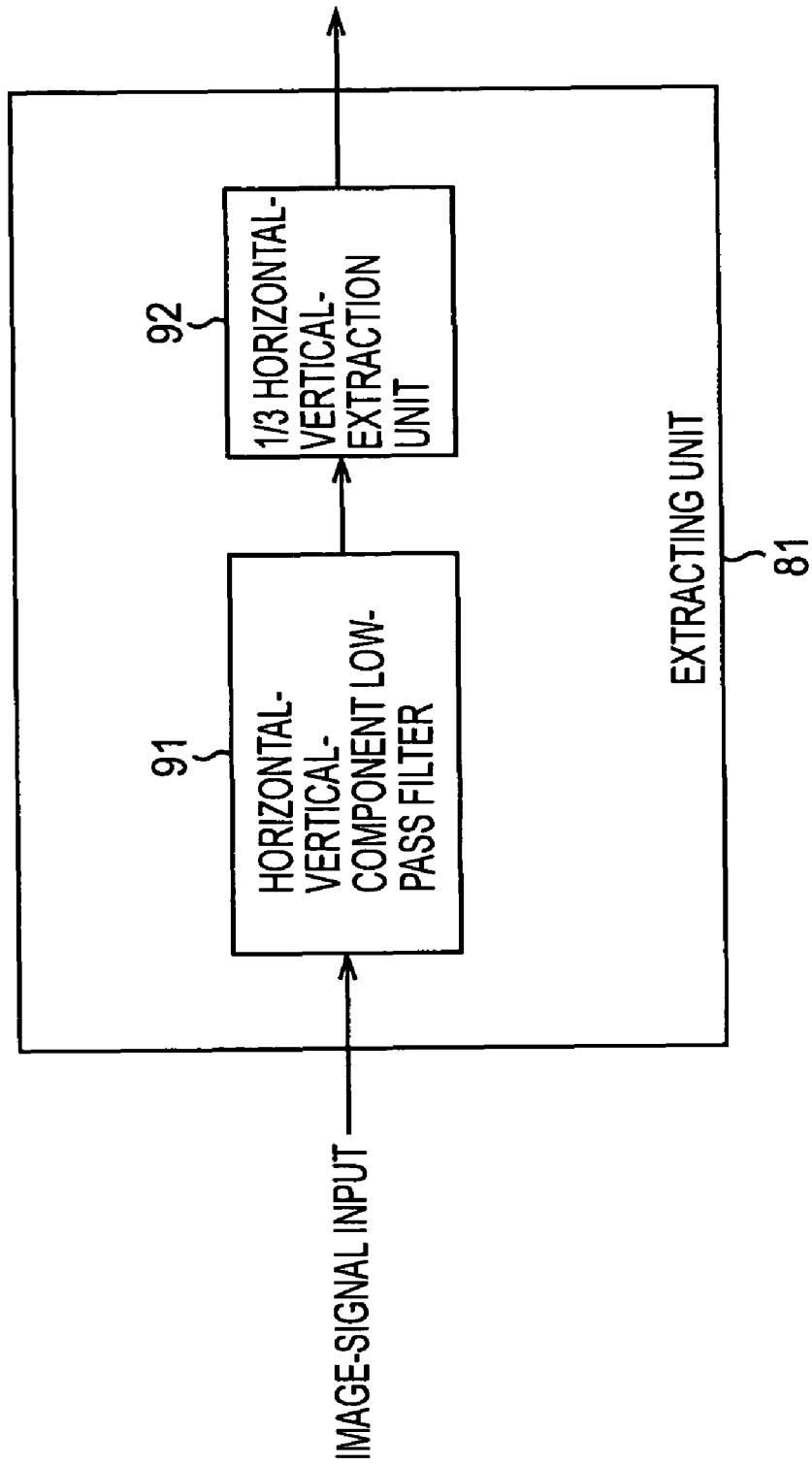
FIG. 16 is a block diagram illustrating another structure of the extracting unit.

When the image-capturing unit 13 in the digital camera 1 shown in FIG. 3 can read out images in blocks, extraction can be performed simultaneously in the horizontal direction and in the vertical direction by employing an extracting unit 81 shown in FIG. 16, instead of the extracting unit 14.

A horizontal-vertical-component low-pass filter 91 subjects the input image signals to (1, 0, 1, 0, 1)/3 filtering in the horizontal direction and (1, 0, 1, 0, 1)/3 filtering in the vertical direction. In other words, the horizontal-vertical-component low-pass filter 91 has a filter factor of (3, 0, 3, 0, 3)/9 in the horizontal and vertical directions to average nine adjacent pixels of the same color in the horizontal and vertical directions. A ⅓ horizontal-vertical-extraction unit 92 resamples (extracts) every third pixel in the horizontal and vertical directions, that is to say, resamples nine pixels to one pixel.

Figure 17:
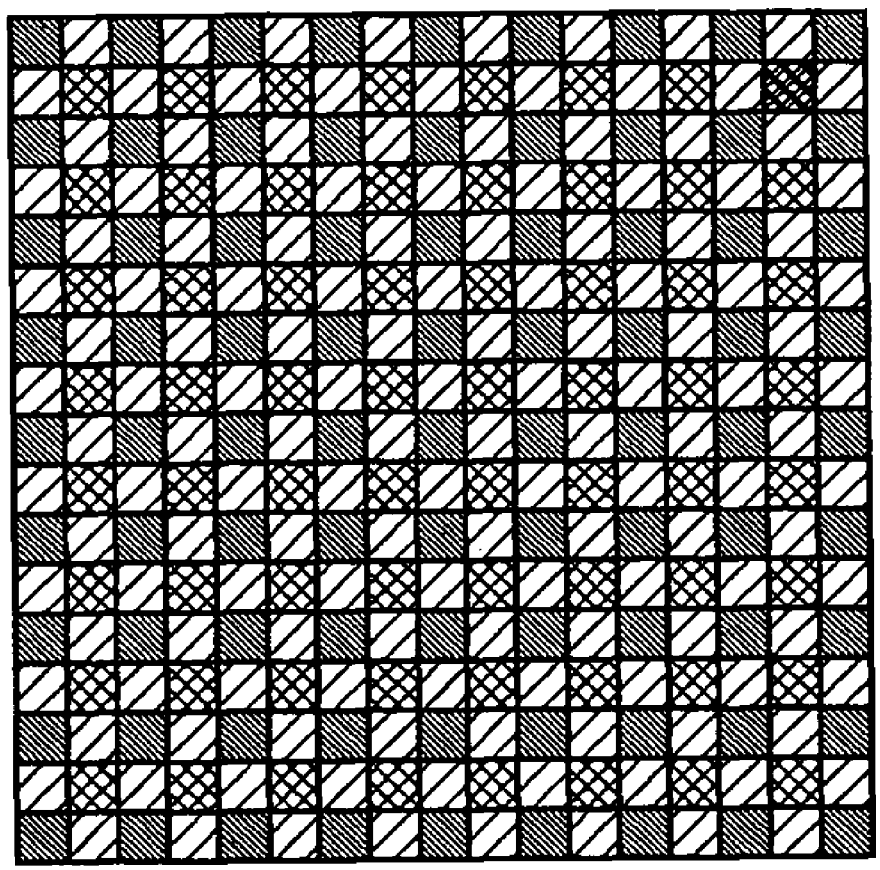
FIG. 17 illustrates image signals input to the extracting unit shown in FIG. 16.
Figure 18:
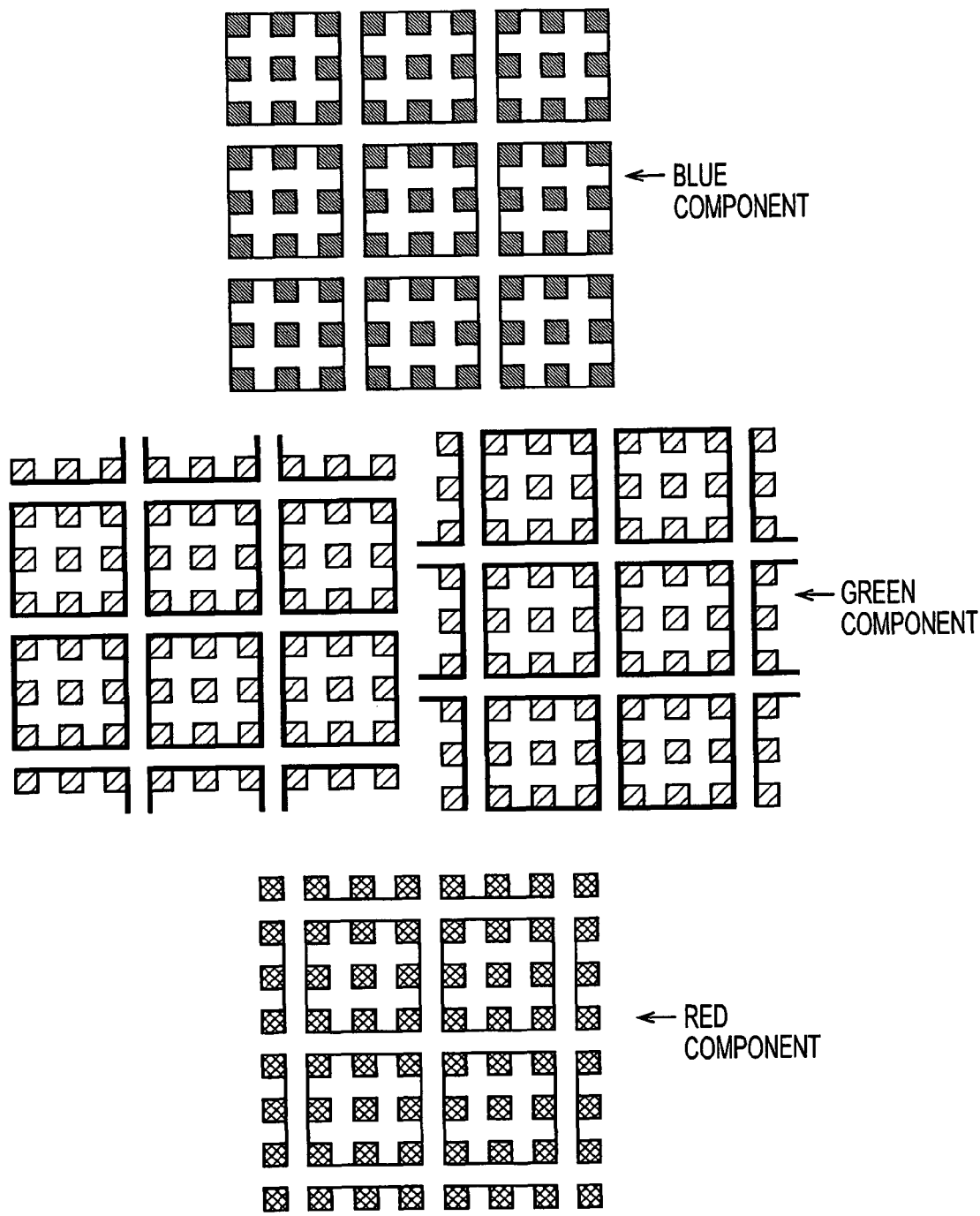
FIG. 18 illustrates a process performed by the extracting unit shown in FIG. 16.

For example, when the color filters are arranged in the 2×2 Bayer array, the horizontal-vertical-component low-pass filter 91 subjects the input pixels shown in FIG. 17 to (3, 0, 3, 0, 3)/9 filtering in the horizontal and vertical directions by blue, green, and red components as shown in FIG. 18. The pixels whose color component is not the same as that of the target pixel are multiplied by 0, the pixels whose color component is the same as that of the target pixel are multiplied by 1, and the sum of pixel values of the nine pixels including the target pixel is divided by 9. As a result, the nine adjacent pixels of the same color in the horizontal and vertical directions are averaged.

Figure 19:
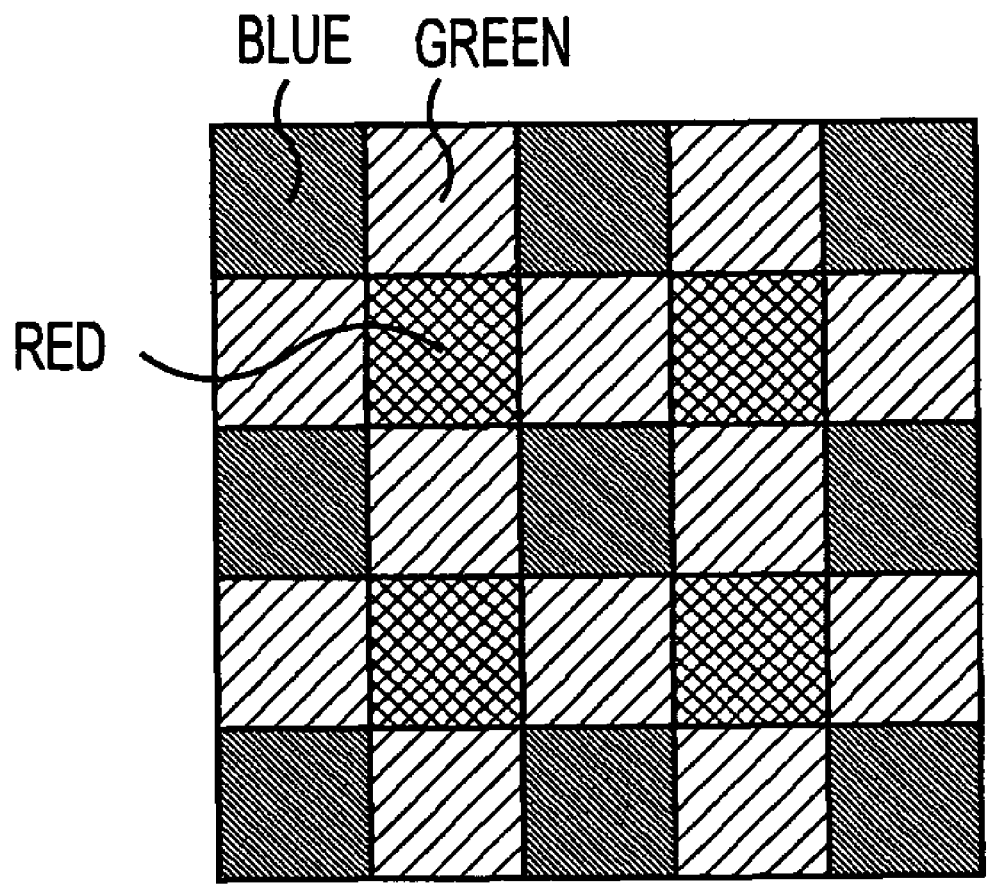
FIG. 19 illustrates image signals output from the extracting unit shown in FIG. 16.

One of the nine adjacent pixels in the horizontal and vertical directions is then extracted in the ⅓ horizontal-vertical-extraction unit 92 to generate an extracted image shown in FIG. 19.

In a 5×5 square pixel group (n, m) (where 1≦n≦5, and 1≦m≦5) having a target pixel in the center and including three pixels of the same color in the horizontal and vertical directions, nine pixels at (1, 1), (1, 3), (1, 5), (3, 1), (3, 3) (i.e. the target pixel), (3, 5), (5, 1), (5, 3), and (5, 5) are averaged. However, pixel groups of any shape can be employed for the averaging as long as the phase positions of the pixels do not change after the extraction.

Figure 20:
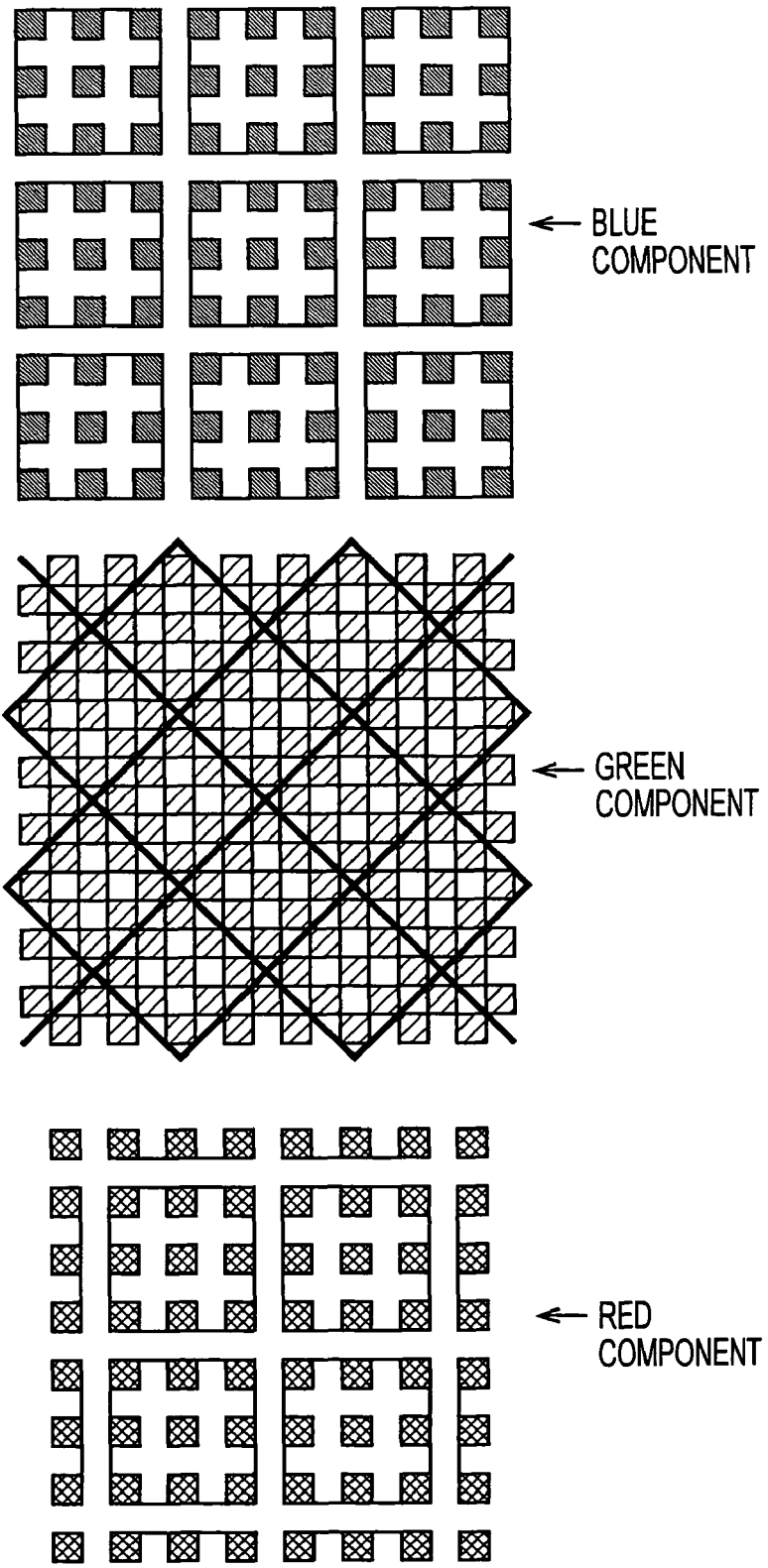
FIG. 20 illustrates another process performed by the extracting unit shown in FIG. 16.

For example, as shown in FIG. 20, the horizontal-vertical-component low-pass filter 91 may subject the pixels of the blue and red components to the (3, 0, 3, 0, 3)/9 filtering in the horizontal and vertical directions, and may subject the pixels of the green component to (1, 2, 3, 2, 1)/9 filtering in the horizontal and vertical directions to average nine adjacent pixels located in a diamond shape having the target pixel in the center.

In this manner, for the pixels of the green component disposed in a mosaic pattern, the average of the nearest nine pixels to the target pixel can be calculated by performing the (1, 2, 3, 2, 1)/9 filtering in the horizontal and vertical directions and averaging the nine adjacent pixels located in a diamond shape, compared to the filtering by (3, 0, 3, 0, 3)/9 illustrated with reference to FIG. 18.

For this simultaneous extraction in the horizontal and vertical directions, in particular, when the filter factors are different according to the pixels, as illustrated with reference to FIG. 20, the extraction can be performed by a CCD functioning as an image-pickup device included in the image-capturing unit 13 in the digital camera 1 shown in FIG. 3, but CMOS is more suitable than the CCD for the image-pickup device.

In the simultaneous extraction in the horizontal and vertical directions, extraction having the same effect is also viable when the extraction rate is 1/(2n−1) (where n is a positive integer) besides the extraction rate of 1/3.

As described with reference to FIGS. 16 to 20, the horizontal-vertical extraction to which the present invention is applied can generate a trap point at the sampling frequency fs' after the extraction and can appropriately limit the frequency band at the Nyquist threshold frequency fn', and therefore, the extracted images have substantially no phase shifts therein. Furthermore, this horizontal-vertical extraction can generate extracted images having very small aliasing therein since all the pixels are utilized for the extraction.

In the above-described processing, since pixel ranges of each color component are spatially repeated and averaged, the color-coding array of the image after the extraction is the same as that before the extraction. Accordingly, the present invention is applicable to processing utilizing any color-coding arrays as long as 2×2 color-coding arrays are employed.

Though the Bayer array of three primary colors of light is employed above, the present invention is also applicable, for example, when color-coding arrays with complementary colors are employed. For example, complementary-color filters often form a 2×2 pattern with CMYG composed of CMY (cyan, magenta, and yellow) of subtractive colors and G (green). Naturally, the present invention is applicable when the complementary-color filters are employed.

The series of processes described above can also be performed by software. The software installation is performed by installing the programs composing the software from recording media to computers implemented by dedicated hardware, or, for example, to general personal computers in which various functions are executable by installing various programs.

As shown in FIG. 3, these recording media are packaged media and the like composed of the magnetic disk 21 (including flexible disks), the optical disk 22 (including CD-ROM (compact disk-read only memory) and DVD (digital versatile disk)), the magneto-optical disk 23 (including MD (Mini-Disk®)), the semiconductor memory 24, or the like in which programs are recorded, besides the computers. The recording media are delivered to users for supplying the programs.

In this specification, the step of describing the programs recorded in the recording media includes not only processes performed in the order of description in chronological order, but also processes performed in parallel or individually.

INDUSTRIAL APPLICABILITY

According to the present invention, captured images can be extracted for being displayed, recorded, and output.

Furthermore, according to the present invention, simple averages of (2n−1) (where n is a positive integer) pixels of the same color are determined by utilizing all the pixels of the captured images, and then the pixels are decimated to 1/(2n−1). As a result, extracted images having substantially no phase shifts and very small aliasing therein can be generated.

The invention claimed is:

1. An image-processing apparatus for processing images, comprising:
   an image capture unit for acquiring image signals composed of multiple color components of a 2×2 color-coding array;
   a filter for calculating an average of pixel values of any (2n−1) pixels acquired from the image signals by the image capture unit, each of the acquired (2n−1) pixels including a target pixel and adjacent pixels having the same color component as that of the target pixel, and defining the average by averaging the adjacent pixels and the target pixel having the same color; and
   an extraction unit for extracting a pixel corresponding to the averaged adjacent pixels and the target pixel at an extraction rate of 1/(2n−1), wherein n comprises a positive integer value.

2. The image-processing apparatus according to claim 1, wherein
   the filter calculates the averages of pixel values for all the pixels in a frame of the image signals.

3. The image-processing apparatus according to claim 1, wherein
   the filter selects pixels having the same color component as that of the target pixel and aligned along the horizontal direction with respect to the target pixel, calculates the average of the pixel values of the (2n−1) pixels, and defines the average as the pixel value of the target pixel.

4. The image-processing apparatus according to claim 1, wherein
   the filter selects pixels having the same color component as that of the target pixel and aligned along the vertical direction with respect to the target pixel, calculates the average of the pixel values of the (2n−1) pixels, and defines the average as the pixel value of the target pixel.

5. The image-processing apparatus according to claim 1, wherein
   the filter selects pixels having the same color component as that of the target pixel disposed in a predetermined range in the horizontal and vertical directions with respect to the target pixel, calculates the average of the pixel values of the (2n−1) pixels, and defines the average as the pixel value of the target pixel.

6. The image-processing apparatus according to claim 1, wherein
   for the target pixel for at least one of the multiple color components, the filter selects pixels having the same color component as that of the target pixel in ascending order of distance from the target pixel, calculates the average of the pixel values of the (2n−1) pixels, and defines the average as the pixel value of the target pixel.

7. The image-processing apparatus according to claim 1, wherein for each of the target pixels for all the multiple color components, the filter selects pixels having the same color component as that of the target pixel in ascending order of distance from the target pixel, calculates the average of the pixel values of the (2n−1) pixels, and defines the average as the pixel value of the target pixel.

8. The image-processing apparatus according to claim 1, wherein:

the image capture unit comprises a CMOS IC.

9. The image-processing apparatus according to claim 1, wherein:

the image capture unit, the filter, and the extraction unit are integrated in a single CMOS IC.

10. The image-processing apparatus according to claim 1, further comprising:

a displaying unit for displaying images corresponding to the image signals acquired by the image capture unit, wherein when the images displayed by the displaying unit are moving images, the image signals acquired by the image capture unit are processed by the filter and the extraction unit, and then are displayed by the displaying unit; and when the images displayed by the displaying unit are still images, the image signals acquired by the image capture unit are displayed by the displaying unit without being processed by the unit and the extraction unit.

11. The image-processing apparatus according to claim 1, further comprising:

recording means for recording the image signals acquired by the image capture unit, wherein when the image signals recorded in the recording means are signals corresponding to moving images, the image signals acquired by the image capture unit are processed by the filter and the extraction unit, and then are recorded in the recording means; and when the image signals recorded in the recording means are signals corresponding to still images, the image signals acquired by the image capture unit are recorded in the recording means without being processed by the filter and the extraction unit.

12. The image-processing apparatus according to claim 1, further comprising:

outputting unit for outputting the image signals acquired by the image capture unit, wherein when the image signals output from the outputting unit are signals corresponding to moving images, the image signals acquired by the image capture unit are processed by the filter and the extraction unit, and then are output from the outputting unit; and when the image signals output from the outputting unit are signals corresponding to still images, the image signals acquired by the image capture unit are output from the outputting unit without being processed by the filter and the extraction unit.

13. An image-processing method using an image processor to perform the steps of processing images, comprising:

an acquisition-controlling step for controlling the acquisition of image signals composed of multiple color components of a 2×2 color-coding array;

a filtering step for calculating an average of pixel values of any (2n−1) pixels acquired during the acquisition-controlling step, each of the acquired (2n−1) pixels including a target pixel and adjacent pixels having the same color component as that of the target pixel, and defining the average by averaging the adjacent pixels and the target pixel having the same color; and an extracting step for extracting each pixel having the average calculated by the averaging of the adjacent pixels and the target pixel at an extraction rate of 1/(2n−1), wherein n comprises a positive integer value.

14. A computer-readable recording medium for storing a non-transitory computer program for controlling an image-processing apparatus for processing images, wherein the program comprises:

an acquisition-controlling step for controlling the acquisition of image signals composed of multiple color components of a 2×2 color-coding array;

a filtering step for calculating an average of pixel values of any (2n−1) pixels acquired during the acquisition-controlling step, each of the acquired (2n−1) pixels including a target pixel and adjacent pixels having the same color component as that of the target pixel, and defining the average by averaging the adjacent pixels and the target pixel having the same color; and an extracting step for extracting each pixel having the average calculated by the averaging of the adjacent pixels and the target pixel at an extraction rate of 1/(2n−1), wherein n comprises a positive integer value.

* * * * *